United States Patent [19]
Yamamoto

[11] Patent Number: 5,984,827
[45] Date of Patent: Nov. 16, 1999

[54] TOROIDAL TYPE CONTINUOUSLY VARIABLE TRANSMISSION

[75] Inventor: Takeshi Yamamoto, Yokosuka, Japan

[73] Assignee: Nissan Motor Co., Ltd., Yokohama, Japan

[21] Appl. No.: 08/986,570

[22] Filed: Dec. 5, 1997

[30] Foreign Application Priority Data

Dec. 5, 1996 [JP] Japan .................................. P8-325410

[51] Int. Cl.⁶ .................................................. F16H 15/38
[52] U.S. Cl. ................................................. 476/70; 476/40
[58] Field of Search ................................... 476/40, 41, 70

[56] References Cited

U.S. PATENT DOCUMENTS 5,676,618 10/1997 Nakano et al. ............................ 476/10

FOREIGN PATENT DOCUMENTS 63-130953 6/1988 Japan .

OTHER PUBLICATIONS

Marks' Standard Handbook for Mechanical Engineers, pp. 8–132——8–133, 1978.

*Primary Examiner*—Lenard A. Footland
*Assistant Examiner*—Katrina B. Harris
*Attorney, Agent, or Firm*—Foley & Lardner

[57] ABSTRACT

In a toroidal type continuously variable transmission, an output gear is supported by a taper roller bearing comprising an inner wheel in contact with an output gear, an outer wheel supported by a casing, and a taper roller that rotates in contact with the inner wheel and the outer wheel. Preferably, a shoulder part in contact with the output gear is formed on the output disk, and deformation of the output gear is prevented by setting an outer diameter R3 of the shoulder part to be equal to or less than a maximum contact diameter R1 with which the inner wheel is in contact with the taper roller.

4 Claims, 5 Drawing Sheets

TOROIDAL TYPE CONTINUOUSLY VARIABLE TRANSMISSION

FIELD OF THE INVENTION

This invention relates to a bearing of an input and output shafts of a toroidal type continuously variable transmission used for vehicles.

BACKGROUND OF THE INVENTION

Tokkai Sho 63-130953 published by the Japanese Patent Office in 1988 discloses an angular ball bearing used as a structure for supporting the input/output shafts of a toroidal continuously variable transmission.

In this toroidal type continuously variable transmission, power rollers gripped between an input disk and an output disk transmit a drive force with a speed change ratio according to their gyration angle.

According to this prior art, the input and output shafts are coaxial, and a thrust-load and radial load acting on these shafts are supported by the angular ball bearing. The angular ball bearing comprises inner and outer wheels and a multiplicity of balls gripped between grooves formed in the wheels.

In order to prevent loss of transmitted torque due to sliding of the power rollers, the contact pressure between the rollers and the disks is generally set to be high. Oil having a high viscosity at a high pressure, e.g. traction oil, is filled in a casing of the transmission.

Since a very large load acts in the thrust direction on the angular ball bearing due to a reaction force with which the input disk and output disk grip the power roller, the contact pressure in the angular ball bearing, i.e., between the balls and grooves is high, and may exceed for example 1 Giga-Pascal (GPa). At such a high pressure, the traction oil becomes semi-solid. It is also known that in the case of an angular ball bearing, slip may occur between the balls and the grooves due to high thrust pressure.

However, when the traction oil is semi-solid and slip occurs in the angular ball bearing, there is a large increase of energy loss, resulting in the decrease of torque transmitting efficiency of the transmission.

SUMMARY OF THE INVENTION

It is therefore an object of this invention to improve a bearing of a toroidal type continuously variable transmission.

In order to achieve the above object, this invention provides a toroidal continuously variable transmission comprising a casing, an input disk, an output disk, an output gear joined to the output disk, an input shaft inserted in the casing, a power roller gripped between the opposite surfaces of the input disk and the output disk, a first taper roller bearing for supporting the output gear, and a second taper roller bearing for supporting the input shaft. The input disk, the output disk, and the output gear are supported on the input shaft. The first bearing comprises a first inner wheel in contact with the output gear, a first outer wheel supported by the casing, and a first taper roller rotating in contact with the first inner wheel and the first outer wheel. The second bearing comprises a second inner wheel supported by the input shaft, a second outer wheel supported by the casing and a second taper roller rotating in contact with the second inner wheel and the second outer wheel.

It is preferable that a shoulder part in contact with the output gear is formed on the output disk, and an outer diameter of the shoulder part is set equal to or less than a maximum contact diameter with which the first inner wheel is in contact with the first taper roller.

It is further preferable that the first inner wheel comprises a collar having a diameter larger than the maximum contact diameter and being in contact with the output gear.

It is also preferable that the output disk and output gear are Joined by a spline.

The details as well as other features and advantages of this invention are set forth in the remainder of the specification and are shown in the accompanying drawings.

DESCRIPTION OF THE PREFERRED EMBODIMENTS

Prior to this invention, the inventor conceived an invention that reduces slip in a bearing used for a continuously variable transmission by applying a taper roller bearing. This invention applies to such a taper roller bearing.

Herein, a toroidal type continuously variable transmission comprising a taper roller bearing will first be described, and this invention will then be described.

Figure 5:
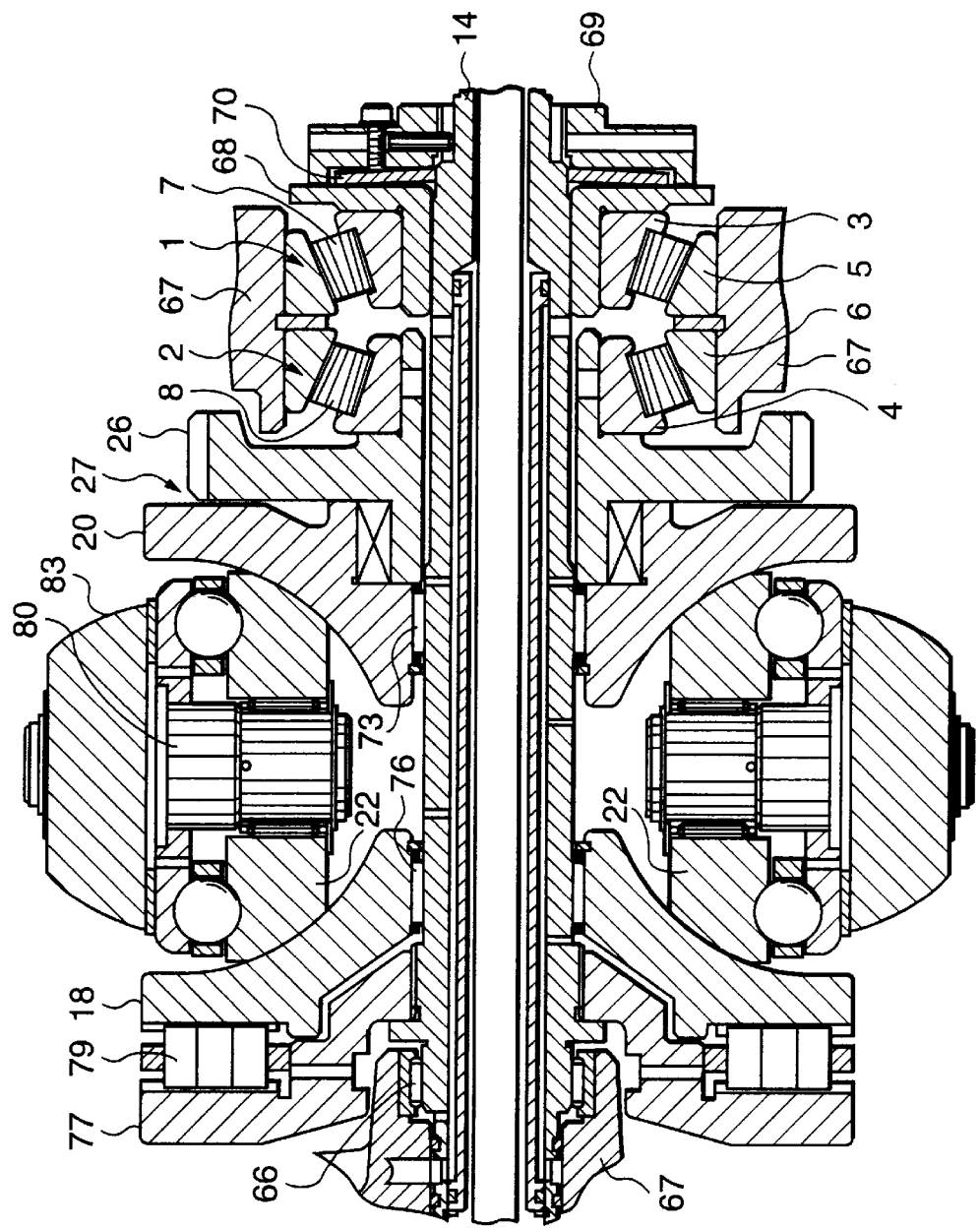
FIG. 5 is a cross-sectional view of a toroidal type continuously variable transmission developed by the inventor prior to this invention.

Referring to FIG. 5 of the drawings, a pair of power rollers 22 are gripped on the inner surfaces of toroidal shaped grooves formed on an input disk 18 and output disk 20. The input disk 18 and output disk 20 are disposed on the outer circumference of an input shaft 14, and the rotation of the input disk 18 is transmitted to the output disk 20 with an arbitrary speed change ratio according to a change of a gyration angle of the power rollers 22.

A cam flange 77 is fixed to the input shaft 14, and a cam roller 79 is gripped between the cam flange 77 and the rear surface of the input disk 18. The cam roller 79 generates a force in an axial direction according to the relative rotation of the cam flange 77 and input disk 18, and presses the input disk 18 toward the output disk 20.

The input disk 18 is supported free to rotate on an input shaft 14 by a needle bearing 76, but rotates effectively together with the input shaft 14 due to a pressure exerted by the cam roller 79 and the cam flange 77.

The input shaft 14 is supported free to rotate in a casing 67 via a taper roller bearing 1 and a needle bearing 66 provided in the vicinity of the cam flange 77.

The output disk 20 is joined to an output gear 26. The output disk 20 is supported free to rotate relative to the input shaft 14 by a needle bearing 73 interposed between the output disk 20 and input shaft 14, and a taper roller bearing 2 interposed between the output gear 26 and casing 67.

A gap 27 is formed between the output disk 20 and the outer circumference of the output gear 26. This is in order that any deformation of the output disk 20 is not easily transmitted to the output gear 26.

The output gear 26 transmits the rotation of the output disk 20 to outside the transmission by engaging with other gears, not shown. This output gear 26 therefore comprises the output shaft.

An outer wheel 5 of the taper roller bearing 1 supporting the input shaft 14 and an outer wheel 6 supporting the output gear 26 are in contact via a snap ring 9 fitted to the casing 67.

The force exerted by the cam roller 79 on the input disk 18 reacts on the input shaft 14 as a thrust toward the left-hand side of the figure. A loading nut 69 is fixed to one end of the input shaft 14. The thrust acting on the input shaft 14 is transmitted to the taper roller bearing 1 via this loading nut 69, a disk spring 70 and a spacer 68. The spacer 68 is in contact with an inner wheel 3 of the taper roller bearing 1.

A small diameter part of the taper roller 7 is disposed facing left-hand side of the figure so that the taper roller bearing 1 supports the aforementioned trust-load. The inner wheel 4 of the taper rolling bearing 2 is in contact with the output gear 26. The small diameter part of the taper roller 8 is disposed facing the right-hand side of the figure so that the taper roller bearing 2 supports the thrust load exerted by the output gear 26 towards the right-hand side of the figure via the inner wheel 4.

The power rollers 22 are gripped by the input disk 18 and output disk 20 due to the initial load of the disk spring 70 and a propulsive force in an axial direction generated by the cam roller 79, and rotate without slipping. Each of the power rollers 22 is supported free to rotate by an eccentric shaft 80 provided on a trunnion 83. The trunnion 83 varies the gyration angle of the power roller 22 according to a displacement at right angles to both the input shaft and the eccentric axis 80, i.e., a front/rear direction in the figure, and varies the speed change ratio accordingly.

This invention applies to the toroidal type continuously variable transmission described above.

Figure 1:
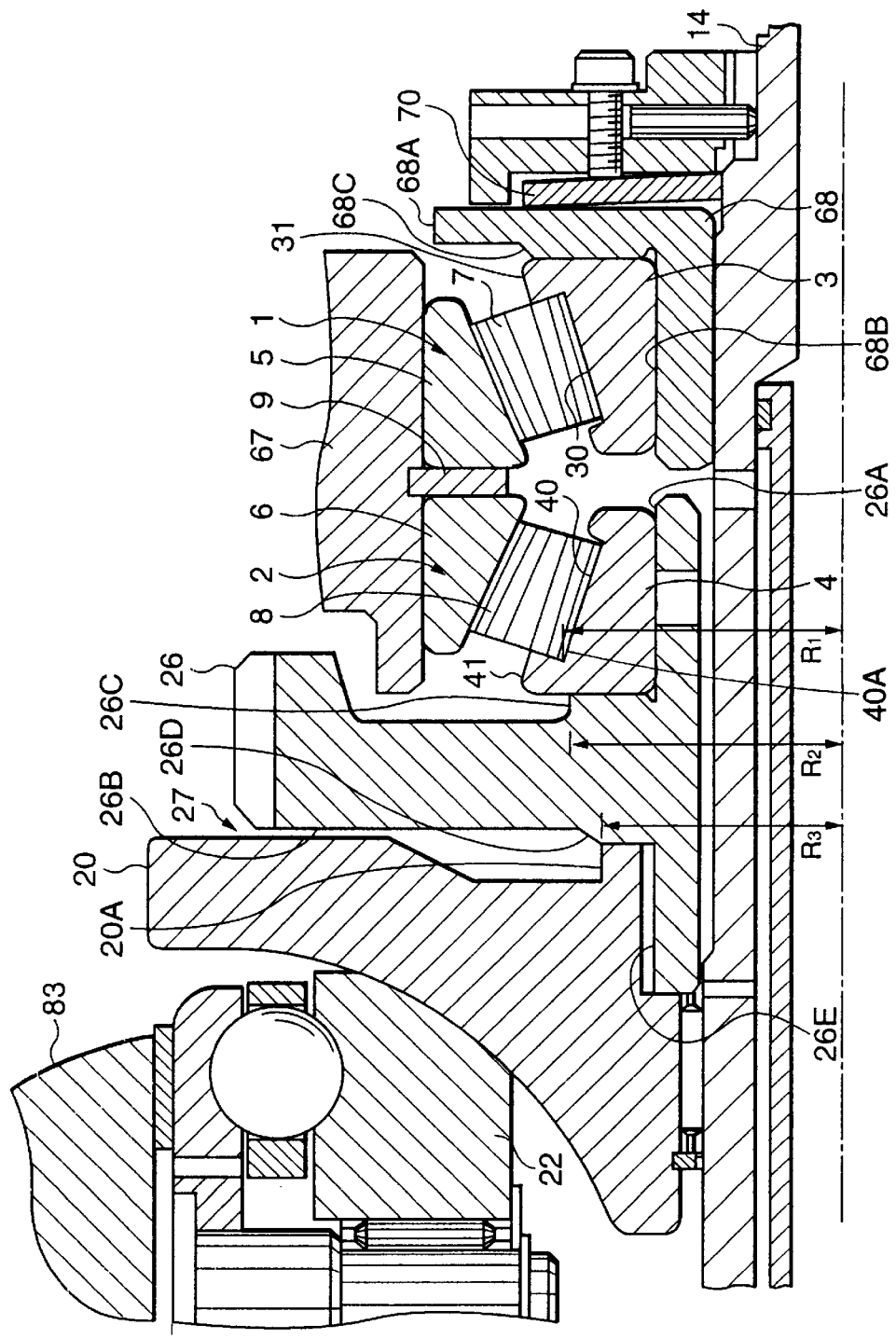
FIG. 1 is a cross-sectional view of the essential part of a toroidal type continuously variable transmission according to this invention.

Referring to FIG. 1 of the drawings, the output gear 26 comprises a cylindrical part 26A projecting toward the right-hand side of the figure, and a spline part 26E projecting toward the left-hand side of the figure.

The outer circumference of the cylindrical part 26A engages with the inner wheel 4 of the taper roller bearing 2. A spline is formed on the outer circumference of the spline part 26E, and this spline engages with a similar spline formed on the inner circumference of the output disk 20.

A shoulder part 26C is formed on a lateral face of the output gear 26 which is in contact with the inner wheel 4 of the taper roller bearing 2. The outer diameter R2 of the shoulder part 26C, is set so that it is equal to or less than a diameter R1 of the maximum diameter part of a raceway surface 40 of the inner wheel 4 in contact with the taper roller 8, i.e., $R2 \leq R1$. R1 and R2 denote the radii from the center line of the input shaft 14.

A shoulder part 26D having an outer diameter smaller than the outer diameter R2 of the shoulder part 26C is formed on a lateral face 26B of the output gear 26 facing the output disk 20.

The shoulder part 26D is in contact with the shoulder part 20A formed on the rear face of the output disk.

The outer diameter R3 of the shoulder part 20A is set less than the diameter R1 of the maximum diameter part of the raceway surface 40, and it is also set to be less than the maximum diameter R2 of the shoulder part 26C of the output gear 26. Accordingly, the outer diameters are in the relation $R3 < R2 \leq R1$.

A shoulder part 68C having an outer diameter larger than the maximum radius of the raceway surface 30 of the inner wheel 3 and in contact with the inner wheel 3, is formed on a flange part 68A of the spacer 68.

The reaction force of the thrust load gripping the power roller 22 acts on the input shaft 14 and the output gear 26. This reaction force is supported by the taper roller bearings 1 and 2. This taper roller bearing is less likely to slip compared to an angular ball bearing, and torque loss inside the transmission is therefore small compared with the aforesaid prior art example having the angular ball bearing.

Figure 2:
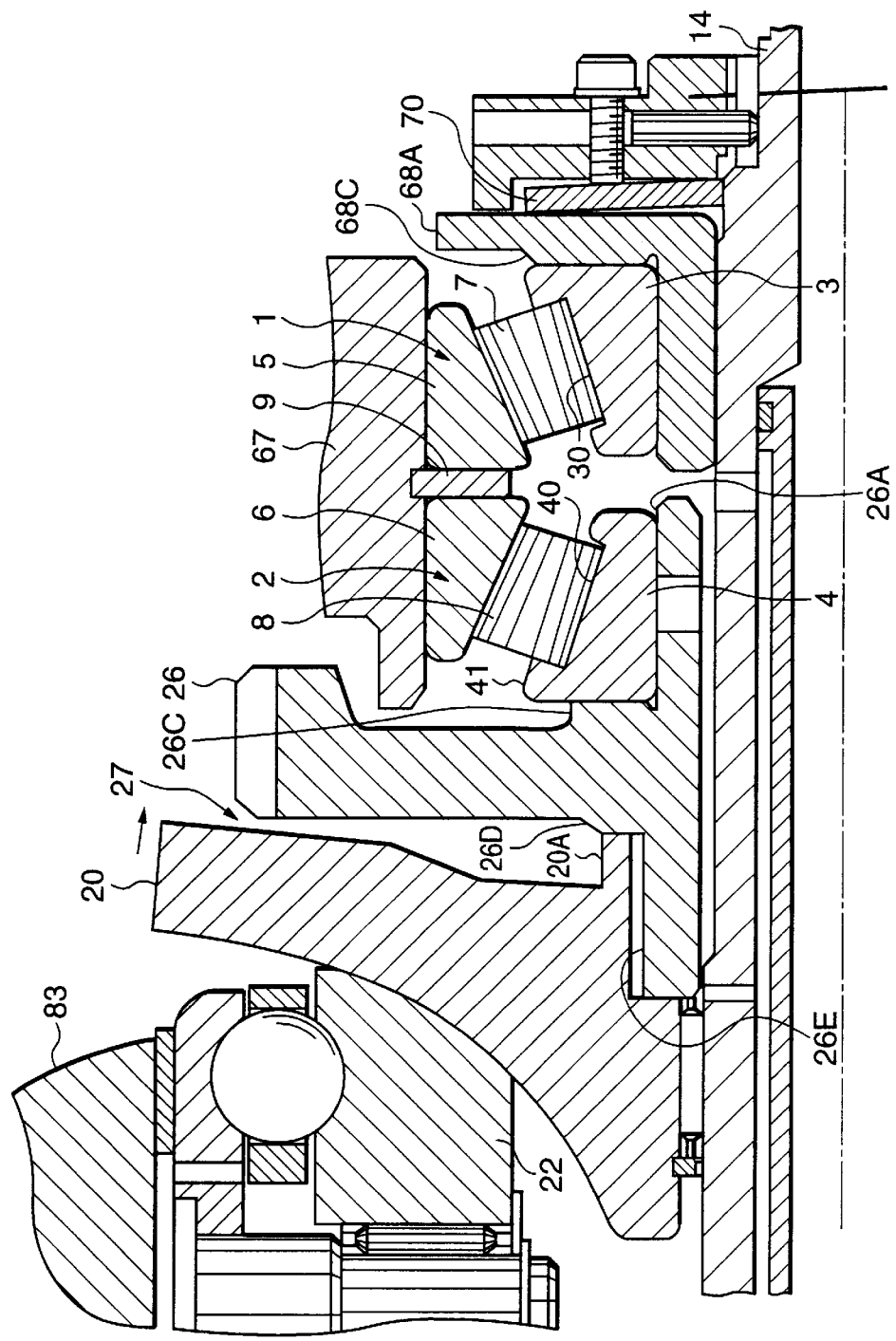
FIG. 2 is a cross-sectional view of the essential part of the toroidal type continuously variable transmission showing a deformed state of an output disk.

As shown in FIG. 2, the output disk 20 deforms in the direction of the output gear 26 due to the pressing force of the power rollers 22.

In this case, the deformation of the outer circumference of the output disk 20 is absorbed by a gap 27. Deformation on the inner circumference of the output disk 20 is suppressed due to the fact that the shoulder 20A is in contact with the shoulder part 26D of the output gear 26.

Herein, the outer diameter R3 of the shoulder part 20A is less than the diameter R1 of the maximum diameter part of the raceway 40 of the inner wheel 4, and less than the diameter R2 of the shoulder part 26C of the output gear 26, hence the pressing force in an axial direction exerted by the shoulder part 20A on the output gear 26 is supported by the taper roller bearing 2 via the contact surface of the shoulder part 26C and inner wheel 4 without deforming the output gear 26. Engaging of the output gear 26 with other gears is therefore well maintained.

The thrust load gripping the power rollers 22 pushes the inner wheel 3 of the taper roller bearing 1 against the spacer 68. The taper roller 7 therefore tends to deform a collar 31 of the inner wheel 3 towards the right-hand side of FIG. 1. However, the shoulder part 68C of the flange 68A, which has an outer diameter larger than the maximum radius of the raceway surface 30 of the inner wheel 3, suppresses this deformation. Sticking of the taper roller 7 and collar 31 does not occur, and the taper roller bearing 1 has high durability. Likewise, for the taper roller bearing 2, the shoulder part 26C, having the radius R2 larger than the maximum radius R1 of the raceway surface 40 of the inner wheel 4, prevents deformation of a collar 41.

As the output disk 20 and output gear 26 are joined via the spline part 26E, the join rigidity is better than that of, for example, a key join. Further, the outer diameter of the spline join is generally less than that of a key join. This makes it easier to reduce the outer diameter R3 of the shoulder part 20A of the output disk 20.

Figure 3:
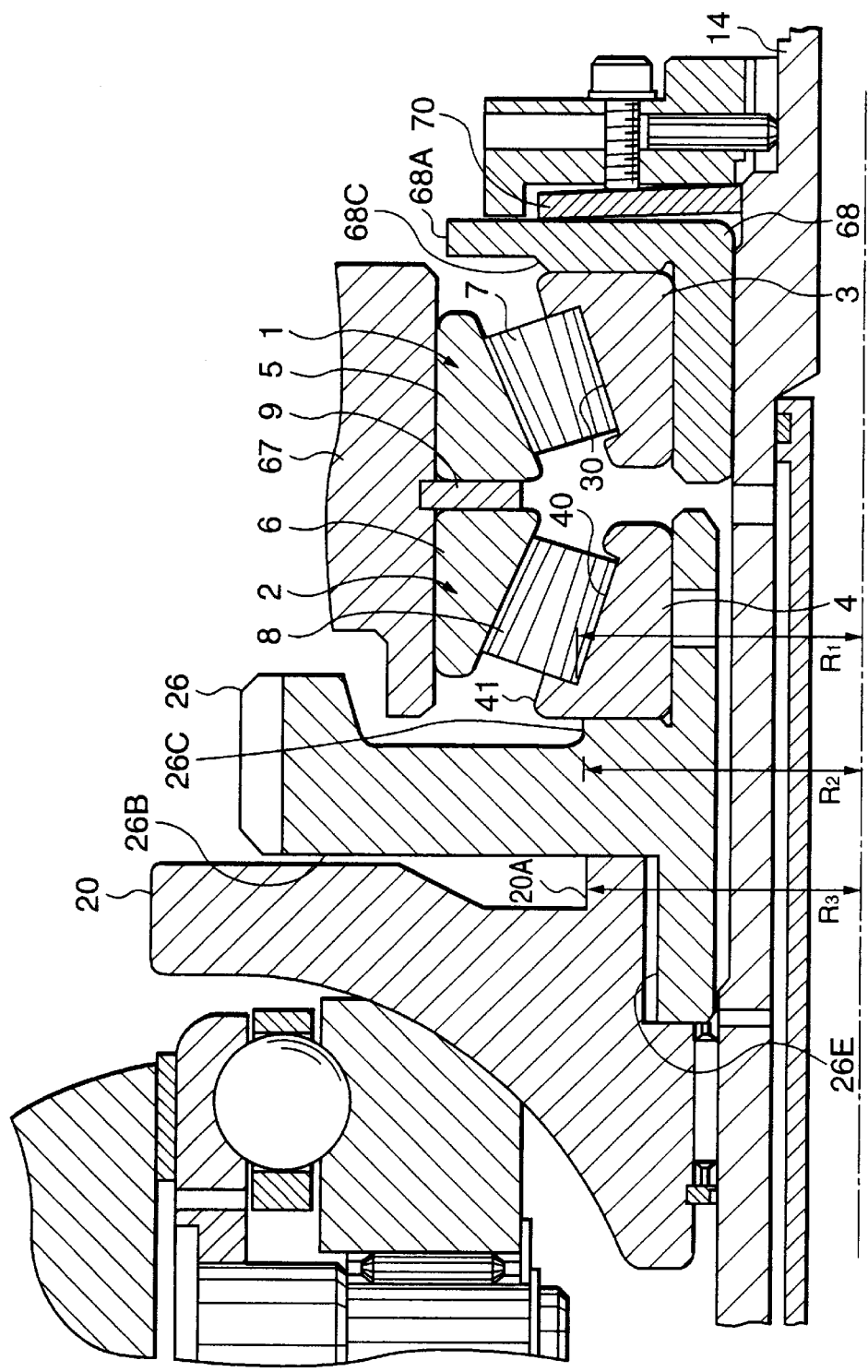
FIG. 3 is similar to FIG. 1, but showing a second embodiment of this invention.

FIG. 3 shows a second embodiment of this invention.

According to this embodiment, the outer diameter P3 of the shoulder part 20A of the output disk 20 of the aforesaid first embodiment is set to be equal to the outer diameter R1 of the maximum diameter part of the raceway surface 40 of the inner wheel 4 of the taper roller bearing 2. The outer diameter R2 of the shoulder part 26C of the output gear 26 is also equal to the outer diameter R1 of the maximum diameter part of the raceway surface 40 of the inner wheel 4.

The outer diameters are therefore in the relation $R3=R2=R1$.

Further, the shoulder part 20A of the output disk 20 is made to come directly into contact with a lateral face 26B of the output gear 26 without providing the shoulder part 26D on the lateral face 26B of the output gear 26.

The remaining features of the construction are the same as those of the aforesaid first embodiment.

According also to this embodiment, deformation of the output gear 26 due to the force exerted by the shoulder part 20A of the output disk 20 can be definitively prevented as in the case of the aforesaid first embodiment. The outer diameter R3 of the shoulder part 20A may also be set larger than in the aforesaid first embodiment due to the above dimensional conditions.

When the outer diameter of R3 is increased, the distance between the point at which the power roller 22 presses the output disk 20, and the shoulder part 20A supporting the output disk 20, is shorter. In other words, as the distance between the load point and fulcrum is shorter, the amount of deformation of the output disk 20 is less.

Figure 4:
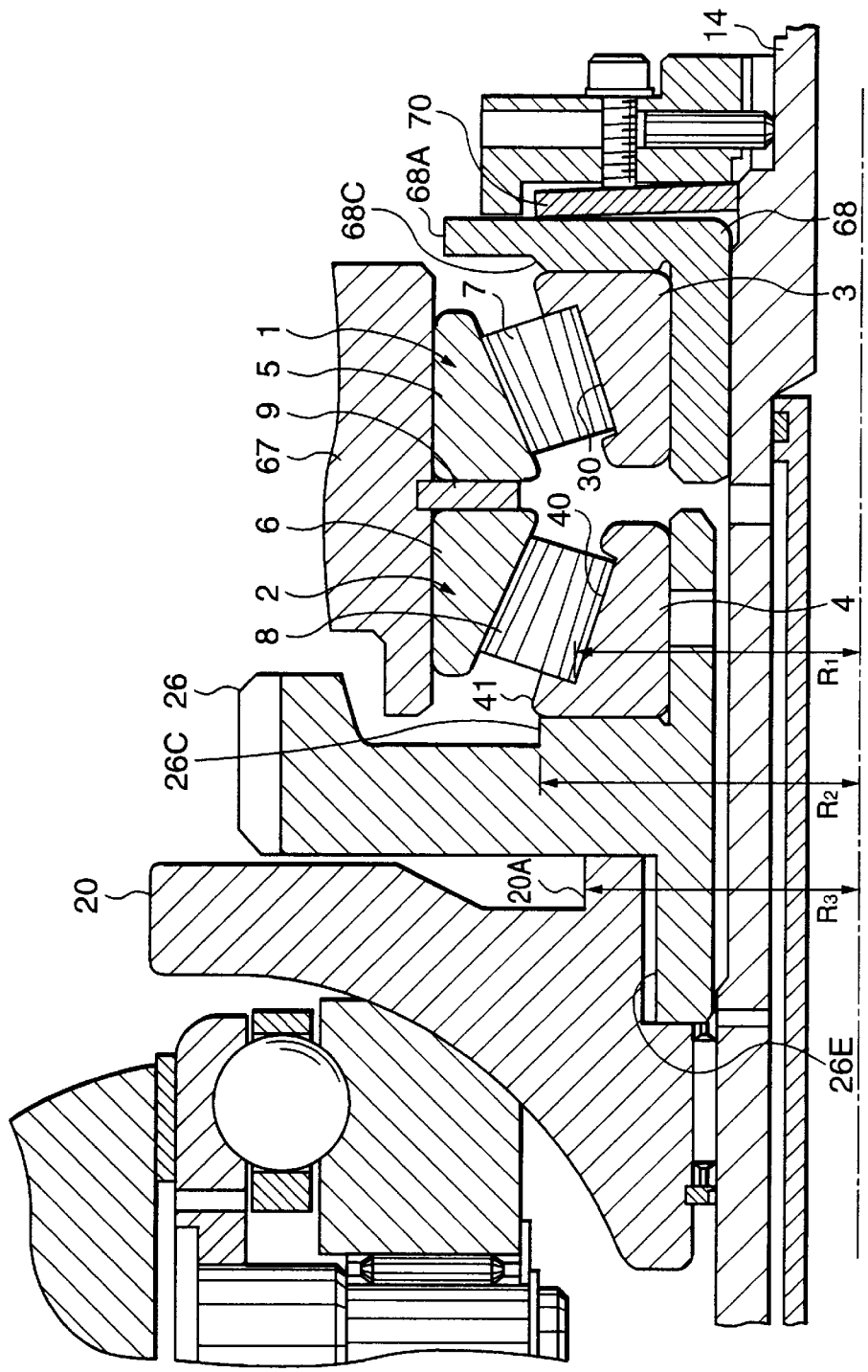
FIG. 4 is similar to FIG. 1, but showing a third embodiment of this invention.

FIG. 4 shows a third embodiment of this invention.

According to this embodiment, the outer diameter R2 of the shoulder part 26C of the output gear 26 is set to be larger than the outer diameter R1 of the maximum diameter part of the raceway surface 40 of the inner wheel 4 of the taper roller bearing 2. The outer diameter of R3 of the shoulder part 20A of the output disk 20 is also set equal to or less than the outer diameter R1 of the maximum diameter part of the raceway surface 40 of the inner wheel 4 of the taper roller bearing 2. The outer diameters are therefore in the relations $R3 \leq R1$ and $R2 > R1$.

The shoulder part 20A is brought in direct contact with the lateral face 26B of the output gear 26 without providing the shoulder part 26C on the lateral face 26B of the output gear 26.

The remaining features of the construction are the same as those of the aforesaid first embodiment.

Due to the aforementioned dimensional setting, the outer diameter R2 of the shoulder part 26C for example becomes effectively equal to the outer diameter of the collar 41 of the inner wheel 4 as shown in the figure.

In this embodiment, by setting $R3 \leq R1$, deformation of the output gear 26 due to the shoulder part 20A as a result of the deformation of the output disk 20 is definitively prevented as in the case of the aforesaid first and second embodiments. Further, the outer diameter R2 of the shoulder part 26C of the output gear 26 was set larger than the outer diameter R1 of the maximum diameter part of the raceway surface 40, so deformation of the collar 41 is suppressed by the shoulder part 26C, and sticking of the taper roller 8 and collar 41 is prevented.

The durability of the taper roller bearing 2 is therefore improved.

The embodiments of this invention in which an exclusive property or privilege is claimed are defined as follows:

1. A toroidal continuously variable transmission comprising:

a casing;

an input disk;

an output disk;

an output gear joined to said output disk;

an input shaft extending in said casing, through said input disk and said output disk, and said output gear being rotatably supported on said input shaft;

a power roller gripped between opposite surfaces of said input disk and said output disk;

a first taper roller bearing supporting said output gear, said first bearing comprising a first inner wheel in contact with said output gear, a first outer wheel supported by said casing, and a first taper roller rotating in contact with said first inner wheel and said first outer wheel; and a second taper roller bearing supporting said input shaft, said second bearing comprising a second inner wheel supporting said input shaft, a second outer wheel supported by said casing, and a second taper roller rotating in contact with said second inner wheel and said second outer wheel, wherein said output disk has a first shoulder part that is in contact with said output gear, wherein said output gear has a second shoulder part that is in contact with said first outer wheel, and wherein an outer diameter of said first shoulder part is set equal to or less than a maximum contact diameter at which said first inner wheel is in contact with said first taper roller, and an outer diameter of said second shoulder part being greater than said maximum contact diameter.

2. A toroidal type continuously variable transmission as defined in claim 1, wherein said first inner wheel comprises a collar having a diameter larger than said maximum contact diameter and being in contact with said output gear.

3. A toroidal type continuously variable transmission as defined in claim 1 wherein said output disk and output gear are Joined by a spline.

4. A toroidal continuously variable transmission comprising:

a casing;

an input shaft rotatably journalled relative to the casing;

an input disk rotatably journalled coaxially on the input shaft and rotatable relative to the input shaft;

an output disk rotatably journalled coaxially on the input shaft and rotatable relative to the input shaft;

an output gear coaxially arranged relative to the input shaft and joined to the output disk;

a power roller gripped between opposite surfaces of the input disk and the output disk;

a first taper roller bearing supporting the output gear and spaced radially from a rotating axis of the input shaft, the first bearing comprising a first inner wheel supporting the output gear, a first outer wheel supported by the casing, and a first taper roller rotatable between the first inner wheel and the first outer wheel; and a second taper roller bearing spaced radially from the input shaft rotating axis, the second bearing comprising a second inner wheel supporting the input shaft, a second outer wheel supported by the casing, and a second taper roller rotatable between the second inner wheel and the second outer wheel, wherein the output disk has a first shoulder part spaced radially at a first distance from the input shaft rotating axis, and contacting the output gear, wherein the output gear has a second shoulder part spaced radially at a second distance from the input shaft axis, and contacting the first inner wheel, wherein the first distance is equal to or less than a maximum contact radial distance at which the first inner wheel contacts the first taper roller, and wherein the second distance is greater than the maximum contact radial distance.

* * * * *